United States Patent Office 3,790,601
Patented Feb. 5, 1974

3,790,601
1,3-BENZODIOXOL-2-THIONES, PROCESS OF MANUFACTURE AND METHOD OF USE
Jean-Jacques Gallay, Magden, Switzerland, assignor to Ciba-Geigy Corporation, Ardsley, N.Y.
No Drawing. Filed Jan. 26, 1971, Ser. No. 109,976
Claims priority, application Switzerland, Jan. 30, 1970, 1,387/70
Int. Cl. C07d *13/10*
U.S. Cl. 260—340.5     8 Claims

ABSTRACT OF THE DISCLOSURE 1,3-benzodioxol-2-thiones of the formula

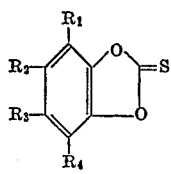

their manufacture, their utility against parasitic nematodes phytopathogenic fungi and representatives of the order Acarina and biocidal preparations containing them are disclosed. In this formula, $R_1$ and $R_2$ each is hydrogen or halogen; $R_3$ is hydrogen, halogen, iso-thiocyanate, lower alkyl or the radical-COR, wherein R stands for lower alkyl, lower halogenalkyl, lower alkoxy, phenoxy or anilino; and $R_4$ is hydrogen, halogen or lower alkoxy; the proviso is that at least one of $R_1$ to $R_4$ is different from hydrogen.

---

The present invention concerns new 1,3-benzodioxazole-2-thiones, processes for their production, their use in combatting parasitic nematodes, phytopathogenic fungi and members of the order Acarina as well as compositions containing the compounds as active ingredients.

The new 1,3-benzodioxole-2-thiones correspond to the Formula I

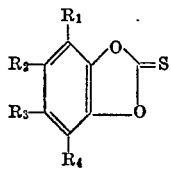

wherein $R_1$ and $R_2$ independently of each other represent hydrogen or halogen,
$R_3$ represents hydrogen, halogen, isothiocyano, lower alkyl or the group —COR wherein R represents lower alkyl, lower halogeno alkyl, lower alkoxy, phenoxy or anilino, and
$R_4$ represents hydrogen, halogen or lower alkoxy, whereby at least one of the symbols $R_1$ to $R_4$ has a meaning other than hydrogen.

In Formula I by lower alkyl and lower alkoxy residues is meant those having 1 to 4 carbon atoms, e.g. methyl, ethyl, n-propyl, isopropyl, n-, sec- or tert-butyl, methoxy, ethoxy, propoxy, isopropoxy or butoxy residues. When $R_3$ represents the group —COR then R may represent one of the said alkoxy residues. Moreover, R as a halogeno alkyl residue is, e.g. a mono or poly chlorinated or brominated lower alkyl residue, especially methyl or ethyl. By halogen, chlorine, bromine and iodine are understood, whereby chlorine and bromine are preferred.

The new 1,3-benzodioxole-2-thiones of Formula I are produced according to the invention by reacting a substituted pyrocatechol of the Formula II

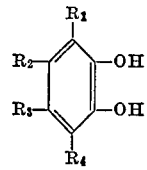

wherein $R_1$, $R_2$, $R_3$ and $R_4$ have the meanings given under Formula I either with thio-phosgene in the presence of a base or with an N,N-disubstituted thiocarbamic acid halide.

For the reaction with thiophosgene, inorganic bases in particular are used, preferably alkali metal hydroxides. However, tertiary amines such as trialkylamines, pyridine and pyridine bases can also be used in the reaction. N,N-dialkyl thiocarbamic acid halides are the preferred N,N-disubstituted thiocarbamic acid halides, as well as N-halogeno thiocarbamyl derivatives of partially or completely hydrated nitrogen-heterocycles. It is advisable to conduct the reactions in solvents or diluents which are inert to the reaction components, e.g. in halogeno hydrocarbons such as chloroform, tri-chloro ethylene, carbon tetrachloride, etc. or hydro-carbons such as benzene, toluene, xylene etc.

The pyrocatechol derivatives of Formula II which serve as starting materials for the process according to the invention are known compounds or can be produced according to known processes.

The 1,3-benzodioxole-2-thiones of the Formula I have not yet been described. Halogenated benz-dioxolones are known from American patent specification No. 3,152,146, and halogenated 1,3-benz-oxathiol-2-ones are known from German patent specification No. 1,114,507. The compounds possess microbiocidal properties and are used as skin disinfectants. 1,3-benzoxathiol-2-one (J. Chem. Soc. 1953 1514 et sec.), benzdioxolone (East German Pat. No. 57856) and 1,3-benzodioxole-2-thione [Ber. 58 2154, (1925)] are known compounds.

The 1,3-benzodioxole-2-thiones of Formula I according to the invention possess valuable acaricidal and anthelmintic properties as well as activity against phytopathogenic fungi. The new active ingredients are non-toxic for both warm-blooded animals and plants whereby 1,3-benzothioxole-2-thiones of the Formula III:

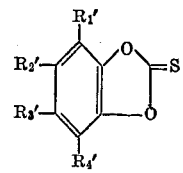

wherein $R_1'$, $R_2'$ and $R_4'$ independently of each other represent hydrogen or halogen and $R_3'$ represents halogen or a low halogeno alkanoyl or a low alkyl residue, deserve special mention.

Preferred compounds of the Formula III are those of the Formula IV

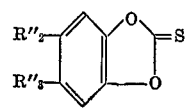

wherein $R_2''$ represents hydrogen, chlorine or bromine and
$R_3''$ represents bromine, methyl or chloracetyl.

The new active ingredients are particularly suitable for combatting parasitic nematodes, e.g. ascarides, trichostrongylides, strongylides, ancylostomatides and cestodes, e.g. taeniides, anoplocephalides, on domestic and farm animals such as cattle, sheep, goats, horses, pigs, cats, dogs and poultry. They can be dispensed to the animals in one shot dose as well as repeatedly, whereby the one shot doses according to the type of animal amount preferably to between 25 and 1,000 mg. per kg./body weight. By a protracted dosing a better effect is produced in some cases, or smaller total doses will suffice. The active ingredients or the mixtures containing them can also be added to the feed or to the drinks. The complete feed contains the substances of the Formula I, preferably in a concentration of about 0.05–1% by weight.

The new active ingredients can be dispensed in the form of solutions, emulsions, suspensions (drenches), powders, tablets, boluses or capsule per-os or abomasally. Useful in the preparation of the above-identified application forms are, for example, the usual solid carriers such as kaolin, talc, bentonite, common salt, calcium phosphate, carbohydrates, cellulose powder, cottonseed meal, carbo-waxes, gelatine or liquids such as water, optimally with the addition of surface-active materials such as ionic or non-ionic dispersants as well as oils and other solvents and diluents not harmful to animal organisms. When the anthelminthic agents are present in the form of feed concentrates, useful carriers are, for example, production feeds, fodder grains or protein concentrates. Such food concentrates can also contain, apart from the active ingredients, additives, vitamins, antibiotics, chemotherapeutics, bacteriostats, fungistats, coccidiostats, hormone preparations, materials having anabolic action, or others favoring growth which influence the quality of the meat of slaughtered animals, or in other ways are useful for the organisms.

The new 1,3-benzodioxole-2-thiones of Formula I are also characterized by their fungicidal activity against numerous phytopathogenic fungi. These fungi causing plant disesases, for example powdery mildews such as cucumber powdery mildew (*Erysiphe cichoraccarum*), apple powdery mildew (*Podosphaera leucotricha*), rose powdery mildew (*Sphacrotheca pannosa*), wheat powdery mildew (*Erysiphe graminis*) as well as downy mildew such as those causing foliage- and tuber-blight of potatoes (*Phytophthora infestans*), the downy grape mildew (*Plasmopora viticola*), moreover leaf spot pathogens such as the pathogen causing tomato blight (*Alternaria solani*), the leaf spot disease of celery (*Septoria apicola*) and rust fungi such as bean rust (*Uromyces appendiculatus*), moreover the highly resistant common grey mold (*Botryis cinera*) etc., are killed by application of the new active ingredients or hindered in their growth. The compounds possess, as well as an excellent lasting effect. a good curative action whereby fungi which have already penetrated into the plant body are killed after application of the new compounds.

The new 1,3-benzodioxole-2-thiones of the Formula I show further good acaricidal properties and are best suited for combatting members of the order Acarina, especially normally-sensitive and resistant mites. By means of the new compounds, the mobile stages larva, Photonymphs, Deutonymphs and adults and the inactive stages (Nymphochrysalids, Deutochysalids and Teleochrysalids) as well as the eggs are killed within a few days. The new 1,3-benzodioxole-2-thiones are, for example, suitable for combatting mites which belong to the following families: Tassonemidae e.g. *Tassonumus/fragoriae*, Tetranychidae, e.g. *Tetranychus urticae*, *Tetranychus/telarius*, *Panonychus ulmi*, Eriophyidae, e.g. *Eriophyes ribis*, *Aceria sheldonis*, and *Phyllocopfurpa oleivorus*.

The production of such pesticidal agents for plant protection according to the invention takes place according to a method known per se by intimate mixing and milling of the ingredients of general Formula I with suitable carriers, optionally with the addition of dispersants or solvents inert to the active ingredients. The active ingredients can be used for the production of dusts, scattering agents, granulates, coated granulates, impregnated granulates, homogenous granulates, wettable powders, pastes, emulsions, solutions or aerosols.

For the production of solid preparations (dusts, powders, scattering agents or granulates) the active ingredients are mixed with solid carriers. Suitable particle size of the carrier in the case of dusts is up to about 0.1 mm., for scattering agents about 0.075 to 0.2 mm. and for granulates 0.2 mm. or more. Active ingredient concentrations in the solid preparations generally amount to 0.5 to 80%. To these mixtures there can be added moreover, stabilizers for the active ingredients and/or nonionic, anionic active and cationic active materials which, for example, improve the adhesion of the active ingredient to the plant or plant components (adhesives and glues) and/or guarantee a better wettability (wetting agents) as well as dispersibility (dispersants).

Active ingredient concentrates dispersible in water, wettable powders, pastes and emulsion concentrates are agents which can be diluted with water to any desired concentration. They consist of active ingredient, carrier, optionally additives which stabilize the active ingredient, surface active substances and anti-foam agents, and optionally solvents. The active ingredient concentration in these agents amounts to in general 0.1 to 95%, especially 5 to 80%. When the application is made from an aeroplane or other suitable application apparatus, preparations containing up to 99.5% of active substance or even pure active substance are used. The wettable powders and pastes are obtained by mixing and milling to homogeneity the active ingredients with dispersants and pulverized carriers in a suitable apparatus. In many cases it is advantageous to use mixtures of different carriers. As anti-foam agent, silicones may for example be mentioned. The active ingredients are mixed, milled, sieved and sifted with the above mentioned additives in such a way that the solid component does not exceed a particle size of 0.02 to 0.04 mm. in the case of wettable powders and in the case of pastes does not exceed 0.003 mm. For the production of emulsion concentrates and pastes dispersants, organic solvents and water are used. The solvent must be practically odorless, not phytotoxic, inert to the active ingredients and must not be easily combustible.

Moreover, the agents according to the invention can be used in the form of solutions. To this end the active ingredient or ingredients of Formula I are dissolved in a suitable organic solvent, solvent mixtures or water. The solutions should contain the active ingredients in a concentration within the range of from 1–20%. Other biocidally active ingredients or agents can be admixed with the agents described according to the invention. Thus, the new agents can contain, apart from the compounds of the Formula I, other fungicides, for example insecticides, herbicides, bacteriocides, fungistats, bacteriostats or nematocides for the extension of the active spectrum. The agent according to the invention can moreover contain also plant fertilizers, trace elements etc.

The following examples further describe the production of the compounds of the invention and compositions containing them as well as their application, but in no way limit the scope of the invention. The temperatures are given in degrees centigrade.

EXAMPLE 1

830 ml. of 10% aqueous sodium hydroxide solution are added dropwise with stirring at 10–15° during 50 minutes to a solution of 186.6 g. of 4-chloracetyl pyrocatechol and 90 ml. (138 g.) of thiophosgene in 1250 ml. of chloroform. The reaction mixture is stirred for 3 hours at room temperature and the solvent distilled off in vacuo at 40°. The suspension remaining is diluted with water, the solid separated off and dried. The 5-chloroacetyl-1,3-benzodioxole-2-thione, recrystallized from benzene/petrol ether, has melting point 135–138°. (Compound No. 1.)

EXAMPLE 2

830 ml. 10% sodium hydroxide solution are added dropwise with stirring at 10–15° during 50 minutes to a solution of 268 g. of 4,5-dibromo pyrocatechol (M. Kohn Am. Soc., 73, 480 (1951); M.P.: 121°) and 85 ml. (128 g.) thiophosgene in 900 ml. of chloroform. After stirring for 3 hours at room temperature the solvent is distilled off at 40° in vacuo and the suspension remaining is diluted with 500 ml. of water. The crystalline solid is separated off, dried and recrystallized from benzene/cyclohexane. The 5,6-dibromo-1,3-benzodioxole-2-thione has melting point 159–161°. (Compound No. 2.)

The following 1,3-benzodioxole-2-thiones were obtained analogously to the foregoing examples.

| No. | Compound | M.P. in ° C. |
|---|---|---|
| 3 | 5-chloro-1,3-benzodioxole-2-thione | 94–101 |
| 4 | 4-chloro-1,3-benzodioxole-2-thione | 105–107 |
| 5 | 5-bromo-1,3-benzodioxole-2-thione | 132–135 |
| 6 | 4,6-dichloro-1,3-benzodioxole-2-thione | 72–73 |
| 7 | 5,6-dichloro-1,3-benzodioxole-2-thione | 154–156 |
| 8 | 5-bromo-6-chloro-1,3-benzodioxole-2-thione | 140–143 |
| 9 | 4,5,6-trichloro-1,3-benzodioxole-2-thione | 127–130 |
| 10 | 4,5,6-tribromo-1,3-benzodioxole-2-thione | 163–166 |
| 11 | 4,5,6,7-tetrachloro-1,3-benzodioxole-2-thione | 210–213 |
| 12 | 4,5,6,7-tetrabromo-1,3-benzodioxole-2-thione | 308–310 |
| 13 | 5-methyl-1,3-benzodioxole-2-thione | 116–117 |
| 14 | 5-ethyl-1,3-benzodioxole-2-thione | 73–76 |
| 15 | 6-chloro-5-methyl-1,3-benzodioxole-2-thione | 155–156 |
| 16 | 5-bromo-6-methyl-1,3-benzodioxole-2-thione | 165 |
| 17 | 5-isothiocyano-1,3-benzodioxole-2-thione | 125–126 |
| 18 | 4-methoxy-1,3-benzodioxole-2-thione | 140–142 |
| 19 | 5-acetyl-1,3-benzodioxole-2-thione | 153–155 |
| 20 | 5-propionoyl-1,3-benzodioxole-2-thione | 107–110 |
| 21 | 5-methoxycarbonyl-1,3-benzodioxole-2-thione | 113–115 |
| 22 | 6-ethoxycarbonyl-1,3-benzodioxole-2-thione | 93–94 |
| 23 | 5-phenoxycarbonyl-1,3-benzodioxole-2-thione | 110–113 |
| 24 | 5-(N-phenylcarbamyl)-1,3-benzodioxole-2-thione | 214–217 |
| 25 | 5-chloracetyl-6-bromo-benzodioxole-2-thione | 125–128 |
| 26 | 5-ethyl-6-bromo-benzodioxole-2-thione | 113 |
| 27 | 5-chloracetyl-6-methyl-benzodioxole-2-thione | 136 |
| 28 | 5-chloracetyl-6-chloro-benzodioxole-2-thione | |
| 29 | 5-n-butyl-1,3-benzodioxole-2-thione | |
| 30 | 5-bromoacetyl-1,3-benzodioxole-2-thione | |
| 31 | 5-dichlorocetyl-1,3-benzodioxole-2-thione | |

EXAMPLE 3

(All parts are given by weight)

(I) Dusting powder (plant protection)

For the production of (a) 10% and (b) 2% dusting powder, the following constituents were used:

(a)

10 parts of 5-chloracetyl-1,3-benzodioxole-2-thione
5 parts highly dispersed silicic acid
85 parts talc (b)

2 parts 5,6-dibromo-1,3-benzodioxole-2-thione
1 part highly dispersed silicic acid
97 parts talc The active ingredients given above were intimately mixed and milled with the carriers. The fungicidal dusting agent so obtained is useful for treating soil for seed beds or for dusting of plants.

(II) Seed dressing (plant protection)

In the production of 10% seed dressing there are used:

(a)

10 parts 5-chloracetyl-1,3-benzodioxole-2-thione
1 part liquid paraffin
89 parts talc The above active ingredients are intimately mixed with the above mentioned carriers and the paraffin as a dispersing agent in a mixer and then milled. The seed dressings obtained in powder form are suitable for the treatment of seeds of all types.

(III) Wettable powder (plant protection)

For the production of (a) 10%, (b) 50% and (c) 80% wettable powder, the following constituents were used:

(a)

10 parts 5-chloroacetyl-1,3-benzodioxole-2-thione
4 parts sodium lignin sulphonate
2 parts finely milled mixture of French chalk and hydroxy ethyl cellulose
10 parts sodium aluminum silicate
50 parts kaolin
23 parts French chalk
1 part sodium dibutyl naphthalene sulphonate (b)

50 parts 5,6-dibromo-1,3-benzodioxole-2-thione
5 parts naphthalene sulphonic acid-phenol sulphonic acid-formaldehyde condensate (3:2:1)
1 part dibutyl naphthalene sulphonic acid-sodium salt
2 parts 1:1 mixture of hydroxy ethyl cellulose and French chalk
20 parts sodium aluminum silicate
22 parts kaolin (c)

80 parts 5-chloroacetyl-1,3-benzodioxole-2-thione
5 parts formaldehyde-naphthalene sulphonic acid sodium salt condensate
2 parts saturated fatty alcohol sulphates
2 parts 1:1 mixture hydroxy ethyl cellulose and French chalk
11 parts sodium aluminum silicate The active ingredients are mixed with the carriers and dispersing agents and finely milled. A wettable powder is obtained with excellent wettability and suspension properties. Suspensions of any desired concentration can be obtained from such wettable powders by adding water. They can be used for the treatment of cultivated plants such as stone fruit trees or pomaceous fruit trees, ornamental shrubs and ornamental plants of all types, vegetables, etc.

(IV) Dispersible powders (as feed additives)

For the production of a 50% dispersible powder there were used:

(a)

50 parts 5-methoxy-1,3-benzodioxole-2-thione
1 part polyethyleneoxypropylene glycol with a molecular weight of about 2000 (Pluronic L 61)
5 parts ammonium salt of a sulphonated naphthalene sulphonic acid-phenol-formaldehyde condensate (Irgatan AG1)
44 parts kaolin (b)

50 parts 5,6-dichloro-1,3-benzodioxole-2-thione
1 part polyethylenoxypropylene glycol with a molecular weight of about 8000 (Pluronic F 68)
0.5 part sodium lignin sulphonate
48.5 parts sodium silicate The said active ingredients were mixed with the carriers and dispersion agents and finely milled. The powder obtained can be mixed with liquid or pulpy feeds and administered to domestic or farm animals.

(V) Pastes (plant protection)

For the production of a 25% paste the following materials were used:

25 parts 5-chloracetyl-1,3-benzodioxole-2-thione
10 parts lignin sulphonic acid (50% aqueous solution)
10 parts ethylene glycol
55 parts water The active ingredient and the dispersing agent were intimately mixed. A paste is obtained which can be diluted with water to suspensions of any desired concentration. Such suspensions are suitable for the treatment of cultivated plants such as, for example, roses, fruit trees and vegetables.

(VI) Paste (feed stuff)

For the production of a 40% paste the following materials were used:

40 parts 5-chloracetyl-1,3-benzodioxole-2-thione
2.5 parts sodium lignin sulphonate
0.3 part sodium benzoate
10 parts glycerine
47.2 parts distilled water The active ingredient and the dispersing agent are mixed intimately. The paste so obtained is admixed with liquid or pulpy feeds for administration to domestic and farm animals.

(VII) Emulsion concentrate (plant production)

For the production of a 10% emulsion concentrate the following constituents were used:

10 parts 5,6-dibromo-1,3-benzodioxole-2-thione
35 parts dimethyl formamide
50 parts petrol (boiling range 230–270° C.)

5 parts of a combined emulsifier consisting of the Ca salt of dodecyl benzene sulphonic acid and the condensation product of ethylene oxide with castor oil (e.g. "Emulat WK"—manufacturer Union Chimique Belge S.A., (Brussells).

The active ingredient concerned is dissolved in petrol or dimethyl formamide and this solution is then added to the combined emulsifier. Emulsion concentrates are obtained which can be diluted with water to emulsions of any desired concentration. Such emulsions are suitable for the treatment of cultivated plants such as, for example, roses, fruit trees and vegetables.

(VIII) Emulsifiable concentrates (drinks)

By mixing:

2 parts 5,6-dibromo-1,3-benzodioxole-2-thione
2 parts polyethyleneoxypropylene glycol with a molecular weight of about 3000 (Pluronic L 64)
96 parts glycol monoethyl ether an emulsifiable concentrate is obtained which can be diluted with water to emulsions of any desired concentration and which can be administered, for example, as a drink to domestic and farm animals.

EXAMPLE 4

(I) Anthelmintic action on hens which are infested with *Ascaridia galli*

1- to 3-day old chicks were infested artificially with eggs of the *Ascaridia galli*. Groups of 5 chickens were used in each experiment. 4 to 5 weeks after infestation the active ingredients were administered to the birds in one dose per day on 3 consecutive days. As controls there were used infested hens which were not medicated.

Evaluation

The number of *Ascaridia galli* eliminated per experimental group during the course of 5 days after the first administration of the active substance were determined daily and the number still detectable in the intestine on dissection on the fifth day of the experiment was likewise counted. Moreover, the number of worm-free hens was determined.

TABLE 1
*Ascaridia galli*

| Active ingredient | Daily dose in mg./kg. body wt. | *Ascaridia galli*— Per experiment day and group eliminated | Per test bird found on dissection | No. of worm-free hens |
|---|---|---|---|---|
| 4-methoxy-1,3-benzodioxole-2-thione | 500 | 142 | 20 | 4 |
| 5-isothiocyano-1,3-benzodioxole-2-thione | 500 | 216 | 0 | 5 |
| 5-bromo-1,3-benzodioxole-2-thione | 500 | 94 | 0 | 5 |
| 5-bromo-6-chloro-1,3-benzodioxole-2-thione | 750 | 38 | 2 | 4 |
| 5-methyl-6-chloro-1,3-benzodioxole-2-thione | 750 | 60 | 0 | 5 |
| 1,3-benzodioxole-2-thione known from Ber. 58, 2,154 (1925) | 200 | 47 | 101 | (1) |
| 5,6-dichloro-1,3-benzodioxole-2-one known from U.S.P. No. 3,152,146 | 750 | 2 | 143 | 0 |

[1] 3 dead birds.

Anthelmintic action on mice attacked by *Hymenolepsis nana*

The active ingredients were administered in the form of a suspension through a stomach probe to white mice which were infested with *Hymenolepsis nana*. For each experiment 5 animals were used. The active ingredients were administered to each animal once a day for three consecutive days. On the 8th day after the beginning of the treatment the animals were killed and dissected.

The evaluation took place after dissection of the experimental animals by counting the tape worms found in the intestine. As controls there were used untreated, simultaneously infested mice of the same type.

The agents were tolerated by the mice without any symptoms.

TABLE 2
*Hymenolepsis nana*

| Active ingredient | Daily dose in mg./kg. body weight | Infestation of the 5 experimental animals on dissection | Infestation of the control animals on dissection |
|---|---|---|---|
| 4-methoxy-1,3-benzodioxole-2-thione | 500 | 0-0-0-0-0 | 9-4-3-5-4 |
| 5,6-dichloro-1,3-benzodioxole-2-thione | 500 | 0-0-0-0-0 | 9-4-3-5-4 |
| 5-chloracetyl-1,3-benzodioxole-2-thione | 500 | 0-0-0-0-0 | 9-4-3-5-4 |
| 4,5,6-tribromo-1,3-benzodioxole-2-thione | 750 | 0-0-0-0-0 | 7-9-8-11-12 |
| 5-bromo-1,3-benzodioxole-2-thione | 300 | 0-0-0-0-0 | 11-8-7-8-13 |
| 4,6-dichloro-1,3-benzodioxole-2-thione | 750 | 0-0-0-0-0 | 3-3-1-3-1 |
| 4,5,6-trichloro-1,3-benzodioxole-2-thione | 1,000 | 0-0-0-0-0 | 11-8-7-8-13 |
| 5-isothiocyano-1,3-benzodioxole-2-thione | 750 | 0-0-0-0-0 | 1-7-5-5-6-9 |
| 5-ethyl-1,3-benzodioxole-2-thione | 750 | 0-0-0-0-0 | 0-1-1-2-3 |
| 5,6-dichloro-1,3-benzodioxole-2-one known from U.S.P. No. 3,152,146 | 750 | 3-2-6-1/1 dead | 11-16-12-20-10 |
| 1,3-benzodioxole-2-one; known from German Patent No. 57856 Beilst. 19.112 | 100 | 15-11-2-7-4 | 4-80-35-9-0 |
| 5-bromo-6-chloro-1,3-benzodioxole-2-thione | 750 | 0-0-0-0-0 | 0-1-1-2-3 |
| 5-methyl-6-chloro-1,3-benzodioxole-2-thione | 750 | 0-0-0-0-0 | 0-1-1-2-3 |
| 5-chloracetyl-6-methyl-1,3-benzodioxole-2-thione | 750 | 0-0-0-0-0 | 1-1-2-3-3 |

(III) Anthelminthic action on mice attacked by mouse Oxyuris

The active ingredients were administered in the form of a suspension by a stomach probe to white mice which were infested with mouse Oxyuris. The active ingredients were administered to each animal once daily over three consecutive days. The animals were then killed on the 8th day after the beginning of the treatment and dissected.

The evaluation took place after dissection of the experimental animals by counting the mouse Oxyuris found in the intestine. As controls there were used untreated, infected mice of the same type.

The agent was tolerated by the mice without trace of any symptoms.

In the following table:

10=inactive, attack of strength as untreated control plants
9-1=reduction of attack according to linear assessment
0=no attack

*Erysiphe cichoracearum*

Table 5

| | |
|---|---|
| 4-methoxy-1,3-benzodioxole-2-thione | 5 |
| 5-chloracetyl-1,3-benzodioxole-2-thione | 3 |
| 5,6-dibromo-1,3-benzodioxole-2-thione | 5 |
| 4,5,6,7-tetrachloro-1,3-benzodioxole-2-thione | 0 |
| 5-(N - phenylcarbamyl)-1,3-benzodioxole-2-thione | 3 |
| 1,3-benzodioxole-2-thione known from Ber. 58, 2154 (1925) | 10 |

TABLE 3

*Mouse Oxyuris*

| Active ingredient | Daily dose in mg./kg. body weight | Infestation of the experimental animals on dissection | Attack of the control animals on dissection |
|---|---|---|---|
| 5,6-dichloro-1,3-benzodioxole-2-thione | 500 | 0-0-0-0-0 | 3-51-58-9-4 |
| 4-methoxy-1,3-benzodioxole-2-thione | 500 | 0-0-0-0-0 | 1-9-8-50-23 |
| 5,6-dibromo-1,3-benzodioxole-2-thione | 500 | 0-0-0-0-5 | 12-5-18-0-12 |
| 5-bromo-1,3-benzodiozole-2-thione | 300 | 0-0-0-0-0 | 3-11-2-6-4 |
| 4,6-dichloro-1,3-benzodioxole-2-thione | 750 | 0-0-0-0-2 | 4-24-25-6-11 |
| 4,5,6-trichloro-1,3-benzodioxole-2-thione | 1,000 | 0-0-0-0-0 | 4-7-12-10-24 |
| 4,5,6,7-tetrachloro-1,3-benzodioxole-2-thione | 750 | 0-0-0-0-0 | 3-11-2-6-4 |
| 5-isothiocyano-1,3-benzodioxole-2-thiene | 750 | 0-0-0-0-0 | 3-2-2-3-2 |
| 5-propionoyl-1,3-benzodioxol-2-thione | 750 | 0-0-0-0-0 | 14-21-8-14-9 |
| 5-(N-phenylcarbamyl)-1,3-benzodioxole-2-thione | 750 | 0-0-0-0-2 | 10-12-8-13-11 |
| 5-bromo-6-chloro-1,3-benzodioxole-2-thione | 750 | 0-0-0-0-0 | 5-8-10-13-32 |
| 5,6-dibromo-1,3-benzodioxole-2-one known from U.S. Patent No. 3,152,146 | 750 | 4-7-2-8-4 | 4-7-12-10-24 |
| 5,6-dichloro-1,3-benzodioxole-2-one known from U.S. Patent No. 3,152,146 | 750 | 2-9-9-2-10 1 dead | 14-21-8-14-9 |
| 1,3-benzoxathiole-2-one known from J. Chem. Soc., 1953 1,514 et sec | 500 | 15-15-27-14-20 | 3-51-58-9-4 |
| 5-methyl-6-chloro-1,3-benzodioxole-2-thione | 750 | 0-0-0-0-0 | 5-8-10-13-32 |

EXAMPLE 5

(I) Action against Botrytis on *Vicia faba* (soya beans)

In Petri dishes which were provided with moistened filter paper there were placed 3 well-developed leaves each of the same size of *Vicia faba* which were sprayed until dripping wet with a brew (0.1% active substance content) of an active substance formulated as a wettable powder. When the leaves were again dry, they were infected with a freshly prepared spore suspension of the fungi. After the leaves had been maintained for 1 to 2 days in a moist atmosphere at 18 to 20° C. black specks, which first formed as points but quickly spread out, appeared on the leaves. The number and size of the infection points served as an evaluation scale for the effectivity of the test substance.

In the following table:

10=ineffective, attack of same strength as untreated control plants;
9-1=reduction of attack according to linear estimation,
0=no attack

*Botrytis cinera*

Table 4

| | |
|---|---|
| 5,6-dichloro-1,3-benzodioxole-2-thione | 4 |
| 5-chloracetyl-1,3-benzodioxole-2-thione | 5 |
| 5,6-dibromo-1,3-benzodioxole-2-thione | 5 |
| 4,5,6-trichloro-1,3-benzodioxole-2-thione | 3 |
| 5-ethoxycarbonyl-1,3-benzodioxole-2-thione | 4 |
| 5-(N-phenylcarbamyl)-1-3-benzodioxole-2-thione | 2 |
| 1,3-benzodioxole-2-thione known from Ber. 58, 2154 (1925) | 10 |

(II) Action of *Erysiphe cichoracearum* (cucumber mildew) on *Cucumis sativus* (cucumber)

Young cucumber plants were sprayed with a spore suspension of the cucumber mildew. After first spraying (dripping wet) with a 0.1% suspension of the active ingredient formulated as wettable powder and drying the spray coating, they were then placed in a greenhouse at 23° C. After 8 days the level of attack (proportion of the leaf surface covered with the fungal coating), on the infected treated leaves was ascertained in comparison with the untreated infected controls.

(III) Action on *Uromyces appendiculates* (bean rust) on beans (*Phaseolus vulgaris*)

Bean plants at the 2-leaf stage were sprayed with a suspension of the substance formulated as wettable powder until dripping wet (concentration 0.1% of active substance). When the plants were again dry they were infected with a fresh spore of bean rust (5 plants per product) and then maintained for one day in a moist chamber, then in a greenhouse at 20–22° C. Experimental evaluation was made according to the number of pustules present after about 8 to 12 days.

In the following table:

10=inactive, attack of same strength as untreated control plants,
9-1=reduction of attack according to linear assessment
0=no attack.

*Uromyces appendiculates*

Table 6

| | |
|---|---|
| 5,6-dichloro-1,3-benzodioxole-2-thione | 3 |
| 5,6-dibromo-1,3-benzodioxole-2-thione | 5 |
| 4,5,6,7-tetrachloro-1,3-benzodioxole-2-thione | 3 |
| 1,3-benzodioxole-2-thione known from Ber. 58, 2154 (1925) | 10 |

Activity on phytopathogenic fungi in open land

As experimental plants there were used grapes, wheat, cucumber, celery, sugar beets and tomatoes. The plants were made up to 1–3 m.² large experimental parcels. Grapes and wheat showed a natural infection of downy mildew (*Plasmopora viticola*) and powdery mildew (*Erysiphe graminis*), respectively.

The other plants had to be infected artificially after about 2 weeks with spore suspensions of the following fungi:

Celery with leaf spot disease (*Septaria apicola*).
Cucumber with powdery mildew (*Erysiphe polyphaga*).

Sugar beets with leaf spot disease (*Cercospora beticola*).

Tomatoes with leaf spot disease (*Alternaria solani*).

To do this the corresponding parcels were covered with a plastic tent. The plants were infected with the spore suspension and then sprayed over 48-72 hours with water in a cloud-like distribution.

The treatments were carried out with 0.1% dispersions of active ingredient (obtained from 50% wettable powders) with a knapsack sprayer (2.5 atm.).

For the naturally infected grapes and wheat, the treatments followed after intervals of 1 to 2 weeks. 8 to 10 treatments were carried out during the main vegetation time; readings were taken every 2 weeks.

Cucumber, celery, sugar beets and tomatoes were each treated at intervals of about one week as follows:

TREATMENTS

|  | Cucumbers | Celery | Sugar beets | Tomatoes |
|---|---|---|---|---|
| Before infection | 2 | 2 | 2 | 1 |
| After infection | 4 | 12 | 7 | 1 |
| X readings at intervals of Y weeks (X/Y), days | 3/1 | 5/2-3 | 4/1-2 | 3/10 |

The evaluation was made according to the following index:

0 = no fungal growth 1) 
2) = intermediary stages of fungal growth

3 = fungal growth = control

The values given in the following table table represent the average of the single readings made by visual evaluation.

As comparative products the following commercial products were used in this experiment:

(1) Triphenylzinc hydroxide.

(2) 7-methyl - 1,3-dithiolo[4,5-b]quinoxaline - 2 - one [Morestan].

(3) 1,4-dithia-anthraquinone - 2,3 - dicarbonitrile [Delan].

These products applied in the same concentration showed an insufficient effect (3) against downy and powdery mildew and also against leaf spot disease or were proved to be phytotoxic especially in the case of triphenylzinc hydroxide.

TABLE 7

| Active ingredient | Plasmophora viticola (grapes) | Erysiphe graminis (wheat) | Erysiphe polyphaga (cucumber) | Septaria apicola (celery) | Cerospora beticola (sugar beet) | Alternaria solani (tomato) |
|---|---|---|---|---|---|---|
| 5-chloracetyl-1,3-benzodioxide-2-thione | 0 |  |  | 1 |  | 0 |
| 5,6-dibromo-1,3-benzodioxide-2-thione |  | 1 | 0 | 1 | 1 | 0 |

EXAMPLE 6

Acaricidal activity

For the determination of acaricidal activity bean leaves were used which were infested by adults, inactive stages and eggs of the red spider mite (*Tetranychus urticae*). The leaves were treated with 0.1-, 0.05- and 0.01% aqueous emulsions of the substance to be tested (prepared from a 10% emulsifiable concentrate). The concentration of active substance was determined which produced 100% mortality after 6 days. The animals used in the experiment were red spider mites of a strain resistant to phosphoric acid esters.

| Active substance | 100% mortality within 6 days with an active substance concentration of x percent for— | | |
|---|---|---|---|
|  | Adults | Inactive stages | Eggs |
| 5,6-dibromo-1,3-benzodioxole-2-thione | 0.01 | 0.01 | 0.01 |

What is claimed is:

1. 1,3-benzodioxol-2-thione of the formula

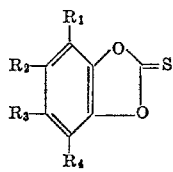

wherein $R_1$ and $R_2$ each is a member selected from the group consisting of hydrogen and halogen;

$R_3$ is a member selected from the group consisting of hydrogen, halogen, iso-thiocyanate, lower alkyl and the radical —COR, R being a member selected from the group consisting of lower alkyl, halogen lower alkyl, lower alkoxy, phenoxy and anilino; and $R_4$ is a member selected from the group consisting of hydrogen, halogen and lower alkoxy with the proviso that at least one of $R_1$ to $R_4$ is different from hydrogen.

2. 1,3-benzodioxol-2-thione according to claim 1 of the formula

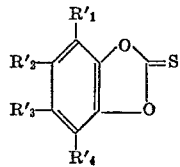

wherein $R'_1$, $R'_2$ and $R'_3$ each is a member selected from the group consisting of hydrogen and halogen and $R'_3$ is a member selected from the group consisting of halogen, halogen lower alkanoyl and lower alkyl.

3. 1,3-benzodioxol-2-thione according to claim 2 of the formula

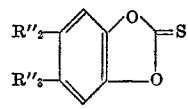

wherein $R''_2$ is a member selected from the group consisting of hydrogen, chlorine and bromine and $R''_3$ is a member selected from the group consisting of bromine, methyl and chloroacetyl.

4. The compound according to claim 3 of the formula

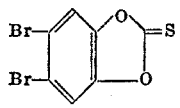

5. The compound according to claim 3 of the formula

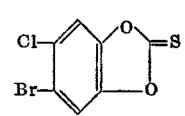

6. The compound according to claim 3 of the formula

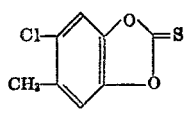

7. The compound according to claim 3 of the formula

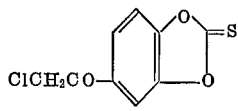

8. Process for the manufacture of 1,3-benzodioxol-2-thione of the formula

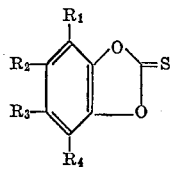

wherein $R_1$ and $R_2$ each is a member selected from the group consisting of hydrogen and halogen;

$R_3$ is a member selected from the group consisting of hydrogen, halogen, iso-thiocyanate, lower alkyl and the radical —COR, R being a member selected from the group consisting of lower alkyl, halogen lower alkyl, lower alkoxy, phenoxy and anilino; and $R_4$ is a member selected from the group consisting of hydrogen, halogen and lower alkoxy with the proviso that at least one of $R_1$ to $R_4$ is different from hydrogen which comprises reacting a pyrocatechol of the formula

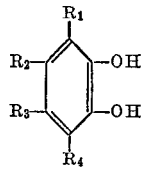

wherein $R_1$ to $R_4$ have the meaning set forth above with (a) thiophosgen in the presence of a basic compound or (b) a N,N-dialkylthiocarbamic acid halide.

References Cited
UNITED STATES PATENTS 3,378,592  4/1968  Lutz _____ 260—340.5 X

FOREIGN PATENTS

Thomae, "Chemical Abstracts," vol. 54 (1960), col. 14595e.

Adley et al., "Chemical Abstracts," vol. 67 (1967), col. 10954m.

ALEX MAZEL, Primary Examiner

J. H. TURNIPSEED, Assistant Examiner

U.S. Cl. X.R.

424—282